US006996626B1

(12) United States Patent
Smith

(10) Patent No.: US 6,996,626 B1
(45) Date of Patent: Feb. 7, 2006

(54) CONTINUOUS BANDWIDTH ASSESSMENT AND FEEDBACK FOR VOICE-OVER-INTERNET-PROTOCOL (VOIP) COMPARING PACKET'S VOICE DURATION AND ARRIVAL RATE

(75) Inventor: Shawn W. Smith, Ventura, CA (US)

(73) Assignee: CrystalVoice Communications, Santa Barbara, CA (US)

( * ) Notice: Subject to any disclaimer, the term of this patent is extended or adjusted under 35 U.S.C. 154(b) by 472 days.

(21) Appl. No.: 10/065,951

(22) Filed: Dec. 3, 2002

(51) Int. Cl.
*G06F 15/16* (2006.01)

(52) U.S. Cl. ...................................... 709/232; 370/352

(58) Field of Classification Search ................ 709/231, 709/232–235; 370/503–519, 231–235, 352, 370/356

See application file for complete search history.

(56) References Cited

U.S. PATENT DOCUMENTS

| | | | | |
|---|---|---|---|---|
| 5,179,549 | A | 1/1993 | Joos et al. | 370/232 |
| 5,274,625 | A | 12/1993 | Derby et al. | 370/233 |
| 5,333,299 | A | 7/1994 | Koval et al. | 713/400 |
| 5,737,531 | A | 4/1998 | Ehley | 709/208 |
| 5,890,108 | A | 3/1999 | Yeldener | 704/208 |
| 5,928,331 | A | 7/1999 | Bushmitch | 709/231 |
| 5,933,803 | A | 8/1999 | Ojala | 704/223 |
| 5,936,940 | A * | 8/1999 | Marin et al. | 370/232 |
| 6,144,639 | A | 11/2000 | Zhao et al. | 370/235 |
| 6,182,125 | B1 | 1/2001 | Borella et al. | 709/218 |
| 6,219,704 | B1 | 4/2001 | Kim et al. | 709/224 |
| 6,308,148 | B1 | 10/2001 | Bruins et al. | 703/27 |
| 6,324,184 | B1 | 11/2001 | Hou et al. | 370/468 |
| 6,356,545 | B1 | 3/2002 | Vargo et al. | 370/355 |
| 6,360,271 | B1 * | 3/2002 | Schuster et al. | 709/231 |
| 6,389,032 | B1 | 5/2002 | Cohen | 370/412 |
| 6,389,038 | B1 | 5/2002 | Goldberg et al. | 370/471 |
| 6,393,016 | B2 | 5/2002 | Wegner et al. | 370/352 |
| 6,404,764 | B1 | 6/2002 | Jones et al. | 370/352 |
| 6,452,922 | B1 | 9/2002 | Ho | 370/352 |
| 6,456,594 | B1 | 9/2002 | Kaplan et al. | 370/238 |
| 6,473,423 | B1 | 10/2002 | Tebeka et al. | 370/352 |
| 6,657,983 | B1 * | 12/2003 | Surazski et al. | 370/337 |

* cited by examiner

*Primary Examiner*—William C. Vaughn, Jr.
*Assistant Examiner*—Duyen M. Doan
(74) *Attorney, Agent, or Firm*—Mark Rodgers

(57) ABSTRACT

A voice-over-Internet-Protocol (VoIP) application estimates bandwidth and congestion of the reception path to the VoIP application from a sending VoIP application. Packet arrivals are timed and the inter-packet delay is compared to the voice duration of the data contained in the more recent packet. When the inter-packet delay is longer than the voice duration the network is slowing and the bandwidth estimate is reduced. The bandwidth estimate is increased when inter-packet delay is smaller than the voice duration. Packet latencies are the difference in send and receive times and are compared to a moving average latency. When the current packet's latency is longer than the moving average, congestion is detected. When the current packet's latency equals the moving average, the network has recovered from congestion and the congestion estimate is reduced. Congestion and bandwidth estimates are added to packets sent out to provide feedback to the other VoIP application.

14 Claims, 9 Drawing Sheets

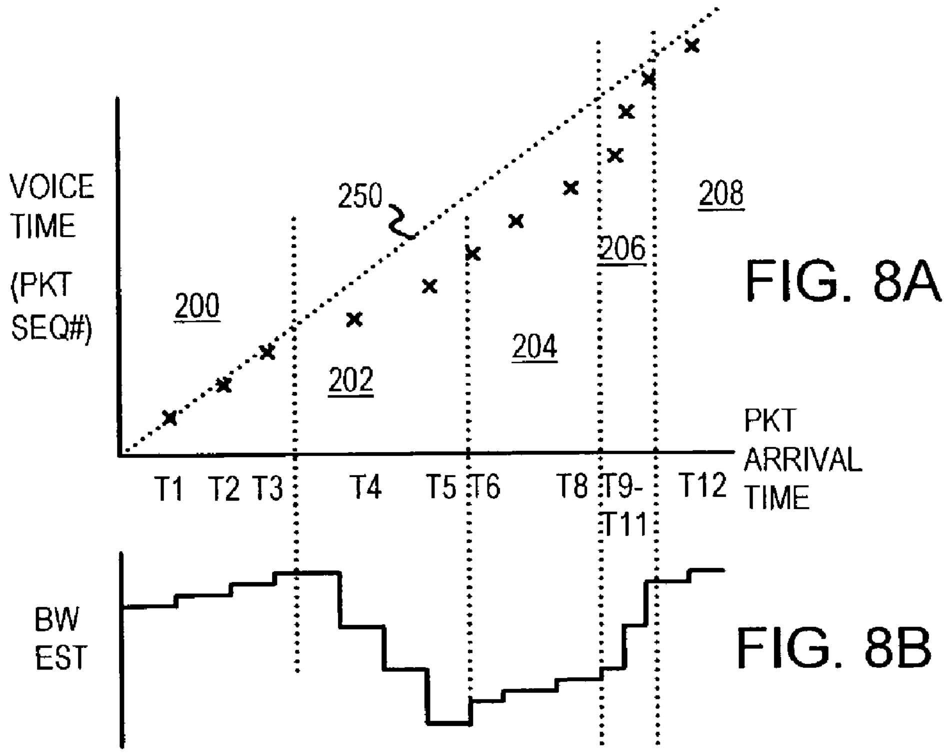
FIG. 8A
FIG. 8B
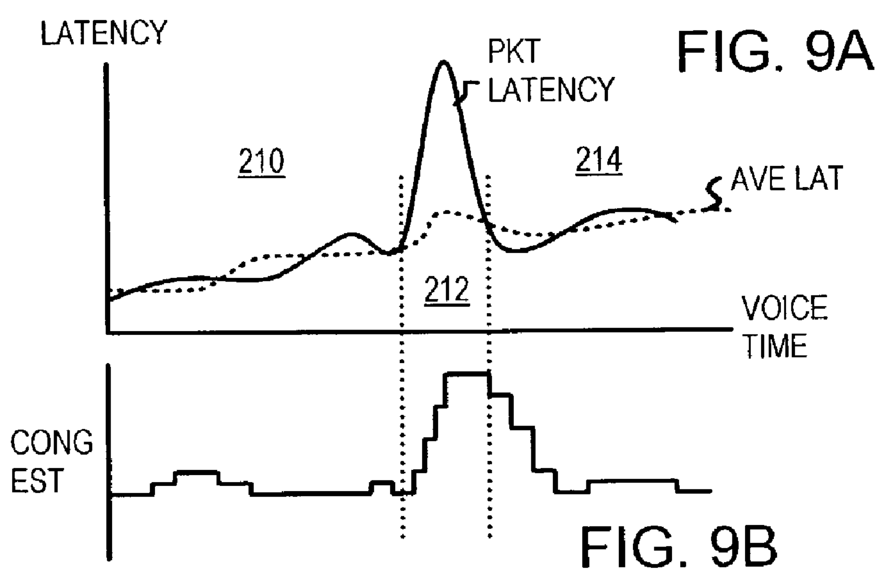
FIG. 9A
FIG. 9B

CONTINUOUS BANDWIDTH ASSESSMENT AND FEEDBACK FOR VOICE-OVER-INTERNET-PROTOCOL (VOIP) COMPARING PACKET'S VOICE DURATION AND ARRIVAL RATE

BACKGROUND OF INVENTION

This invention relates to voice-over-Internet-Protocol (VoIP) systems, and more particularly to measurement of current bandwidth of VoIP channels on an unregulated network such as the Internet.

The widespread availability of the Internet has allowed some traditional applications such as telephone calling to use the Internet rather than traditional telephone networks. Voice-over-Internet-Protocol (VoIP) applications capture a user's voice, digitize and compress the voice, and transmit the coded voice as data inside Internet-protocol (IP) packets. The VoIP packets can be sent over the Internet like any standard IP packet.

VoIP applications can be installed on personal computers (PC's), other devices connected to the Internet, or on translation servers such as Internet-to-Telephone gateways. Each party to a call runs a local copy or client of the VoIP application. Each VoIP application captures and sends voice data, and receives VoIP packets that are decoded and played to the local user. Thus full-duplex voice calls can be made by exchanging VoIP packets between peer-to-peer client applications.

FIG. 1 is a diagram of a prior-art VoIP system experiencing packet loss. VoIP application 10 is operated by user A while VoIP application 12 is operated by user B at different nodes on the Internet. User A's speech is digitized, coded, compressed, and fitted into IP packets 20 by VoIP application 10. These IP packets 20 containing user A's voice are routed over the Internet to VoIP application 12. VoIP application 12 receives these IP packets 20, extracts and decompresses the voice data, and plays the voice as audio to user B. User B's voice is then captured, captured, coded, compressed, and fitted into IP packets 22 by VoIP application 12. IP packets 22 containing user B's voice are also routed over the Internet back to VoIP application 10 for playback to user A. Thus a full-duplex voice call can be made over the Internet using applications 10, 12.

IP packets can be routed over a wide variety of paths using the Internet. Indeed, the de-centralized nature of the Internet allows routing decisions to be made at a number of points along the paths between applications 10, 12. The paths taken by packets 20 in the A-to-B direction can differ from the path taken by packets 22 in the reverse (B-to-A) direction. For example, packets 20 may pass through intermediate routers 14, 16, while packets 22 pass through router 18. Such non-symmetric routing can produce non-symmetric routing delays and challenges for the VoIP system.

Various network problems may occur. A router may temporarily fail, causing some packets to be delayed or lost entirely. The number of arriving packets may suddenly jump, producing congestion such as at router 18. Router 18 may delay packets 24 while the increased packet load occurs. Packets may continue to be delayed after the initial failure is fixed as the packet backlog is worked off. If the input buffers for router 18 overflow, packets 24 may be dropped or lost rather than simply delayed.

Bandwidth limitations may also occur. Packets may need to reach a user through a low-bandwidth dial-up modem line. Occasional interference may further delay packets. The modem user may send email or browse a web site, reducing further the limited bandwidth available to the VoIP application's packets. Thus bandwidth limitations may be both permanent and temporary.

FIG. 2A shows voice data that is packetized and transmitted. The user's voice can be captured as analog waves of varying frequencies that are digitized and coded. The coded voice data is divided into packets and transmitted. Sequence numbers are added to the packets to allow the packets to be re-ordered when some are delayed more than others. The sequence numbers thus allow for out-of-order reception. In this example the coded voice is divided into four packets, each packet containing coded voice data for an equal, fixed time period of 20 milli-seconds.

FIG. 2B shows packetized voice data received after varying network delays. The sequence numbers are used to re-order the packets when they arrive with varying network delays.

In this example, packet 2 is delayed slightly, causing a gap to occur between the end of playing the voice for packet 1, and the start of voice play for packet 2. A larger gap occurs between packets 2 and 3, between times 52 and 52'. These gaps may be filled in by interpolating voice data, or by adding silence. However, the pace of the user's voice may seem uneven or jerky due to such gaps.

Of course, all voice could be delayed by a large amount, such as 5 seconds, to allow for late packets. However, this requires a larger packet-input buffer and would greatly increase the delay or latency that the user hears. This delay may be noticeable to the user and annoying. Full-duplex conversation becomes impractical as the delay grows to several seconds. Thus the input buffer has a practical size limit, and packets cannot be delayed for too long.

Such gaps caused by delayed packets can reduce the quality of the voice played. When a temporary interruption occurs along the path taken by the VoIP packets, packets may pile up in buffers near the point of interruption. Should service be quickly restored, the stored packets in the buffers may be sent after some delay. However, longer-duration interruptions can cause router buffers to overflow. Packets may then be dropped or discarded before reaching their destinations.

Once the interruption ends, the older packets are likely to be sent first by the router. Newer packets may be delayed even after the interruption ends as the backlog of packets is transmitted. Thus stale packets of older voice data may be delivered before more current voice data. These older packets may already be too old to be played, resulting in a lengthening of what was a brief moment of congestion.

Detecting when such congestion occurs or when a limited bandwidth is available could be useful. Transmission of voice packets could be paused to prevent exacerbating the problem, or the user could be notified. Lower-quality voice coding could also be used to reduce the bandwidth consumed by the VoIP packets.

The sending VoIP application may be unaware of packet routing problems. The problems may not exist in packets received from the other VoIP application, as the routing paths may not be symmetrical. Even on a symmetric network congestion or limitations on bandwidth may exist only in one direction, such as upload and download directions on a cable modem. For the example of FIG. 1, VoIP application 10 cannot determine its outbound bandwidth simply by looking for delays of incoming packets received from VoIP application 12, since different routes may be taken by packets 20 sent and packets 22 received by application 10.

During initialization of a call between applications 10, 12, some provisioning may be performed to determine the initial bandwidths available between applications 10, 12. Such provisioning may be similar to fax machines that negotiate compression standards used and bandwidth or baud rate for each call. However, changes to the Internet that later occur during the call are not detected once provisioning is over and the call is started.

What is desired is a VoIP application that can detect network problems such as congestion, limited bandwidth, and delays. A VoIP system that separately measures bandwidth for forward and return paths is desirable. A VoIP application that continuously monitors network conditions is desired.

BRIEF DESCRIPTION OF DRAWINGS

FIGS. 8A–B show graphs of packet arrivals and bandwidth estimates.

FIGS. 9A–B show graphs of packet latencies and congestion estimates.

DETAILED DESCRIPTION

The present invention relates to an improvement in voice-over-Internet-Protocol (VoIP) systems. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
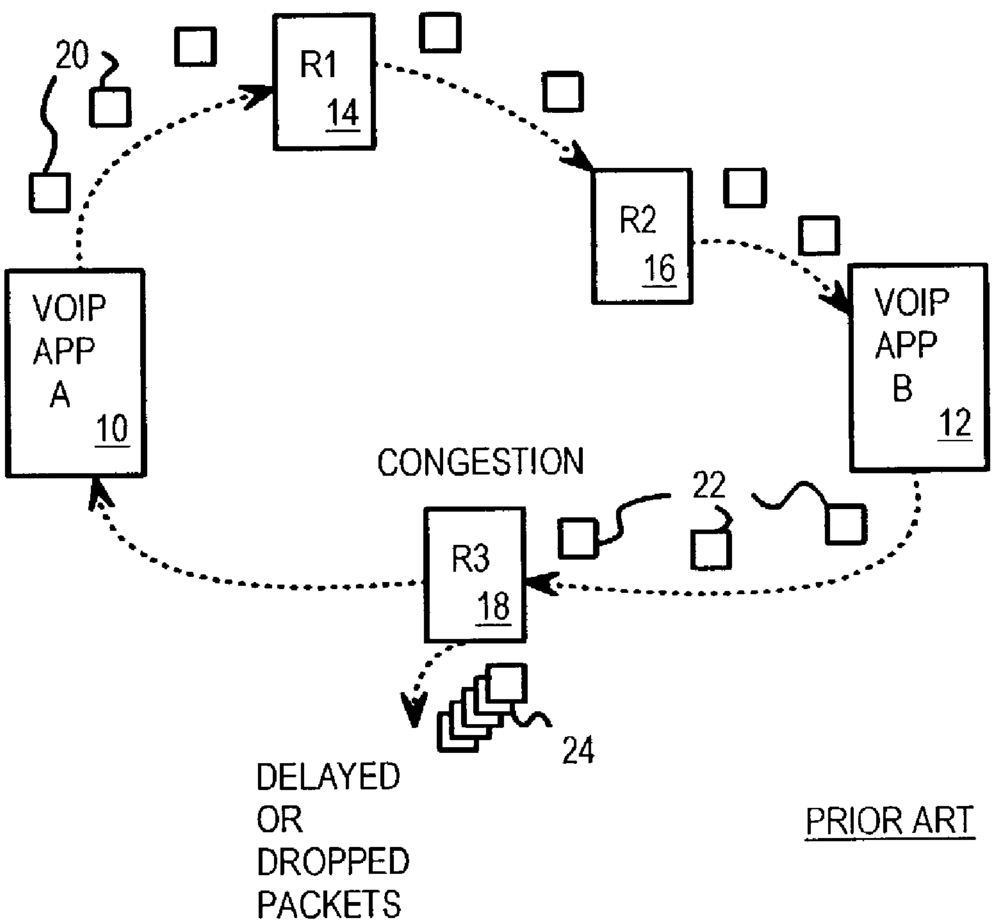
FIG. 1 is a diagram of a prior-art VoIP system experiencing packet loss.
Figure 2A:
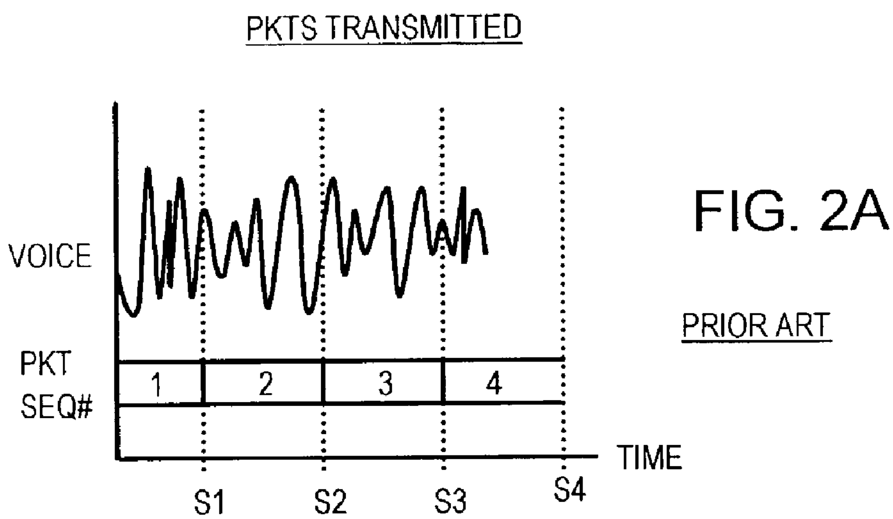
FIG. 2A shows voice data that is packetized and transmitted.
Figure 2B:
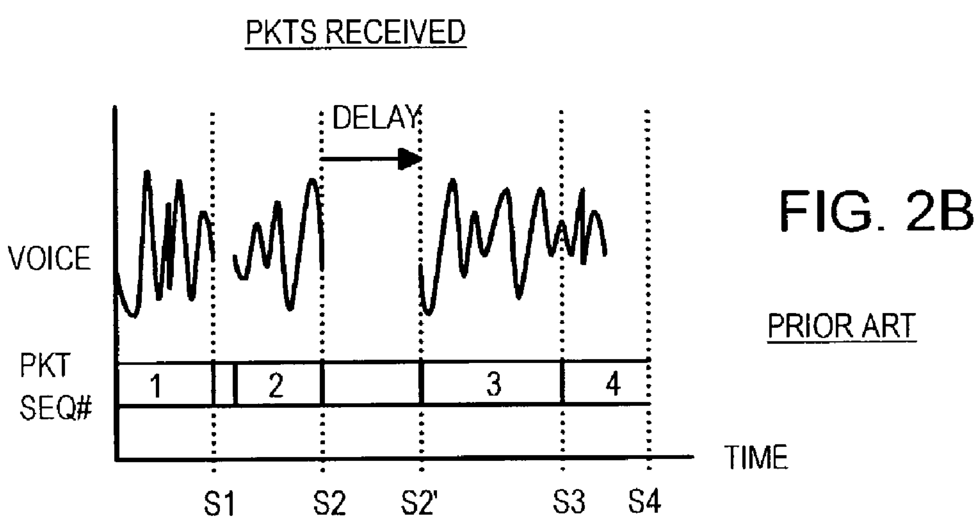
FIG. 2B shows packetized voice data received after varying network delays.
Figure 3:
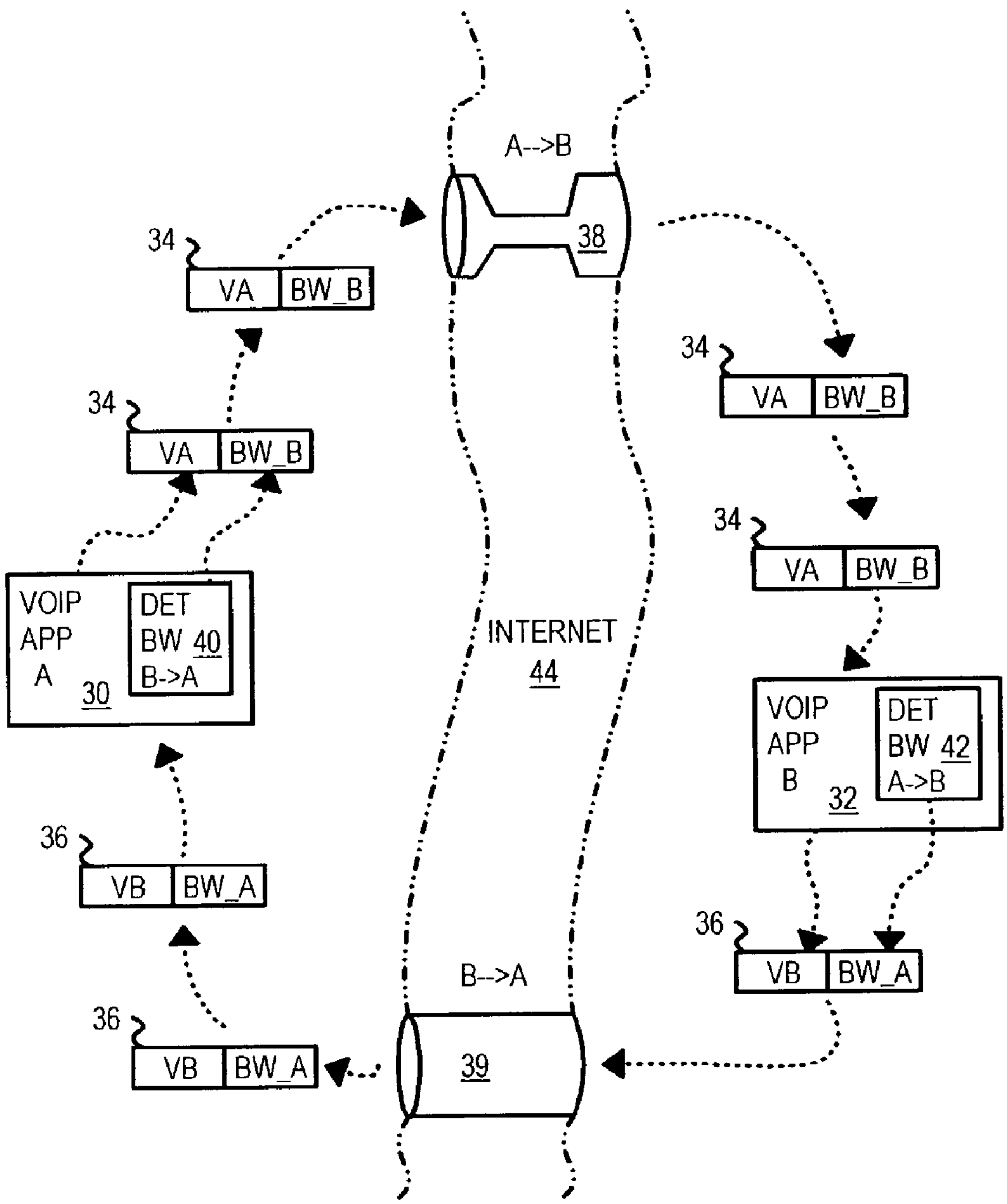
FIG. 3 is a diagram of a VoIP system that continuously measures incoming-packet bandwidth and transmits bandwidth estimates in outgoing packets.

FIG. 3 is a diagram of a VoIP system that continuously measures incoming-packet bandwidth and transmits bandwidth estimates in outgoing packets. VoIP application 30 captures, encodes, compresses, and packetizes voice from user A and sends IP packets 34 over Internet 44 to VoIP application 32 for playback to user B. VoIP application 32 likewise captures, encodes, compresses, and packetizes voice from user B and sends IP packets 36 over Internet 44 to VoIP application 30 for playback to user A.

Packets 34 from user A to B travel through path 38, which has a restricted bandwidth. For example, a router may be congested or a dial-up modem may be in path 38. Packets 36 from user B to user A travel through Internet 44 on a different route, path 39, which has a larger bandwidth in this example and at the time shown.

Bandwidth detector 40 is part of VoIP application 30. Incoming packets 36 are analyzed by bandwidth detector 40 to determine the packets' travel time along path 39 and indirectly estimate the bandwidth of path 39. This bandwidth estimate from bandwidth detector 40 is added to outgoing packets 34. Packets 34 contain both voice data from user A, VA, and the bandwidth estimate for packets 36 sent by user B, BW_B.

When packets 34 are received by VoIP application 32, user A's voice data VA is extracted and played back to user B, and the bandwidth estimate BW_B is read, allowing VoIP application 32 to adjust or halt its transmission of outgoing packets 36. For example, when bandwidth is reduced, VoIP application 32 can signal user B of the problem, such as by generating an audible beep to indicate the poor bandwidth.

Bandwidth detector 42 in VoIP application 32 also measures the arrival rate of incoming packets 34 to estimate the bandwidth of path 38. This bandwidth estimate for user A, BW_A, is added to outgoing packets 36 which contain user B's voice data, VB. Thus packets 36 contain VB and BW_A, while packets 34 contain VA and BW_B.

Bandwidth detector 42 in VoIP application 32 also measures the travel time or latency of incoming packets 34 to estimate the congestion of path 38. When latency begins to increase, congestion is starting to appear.

One-Way Latency Measured, Not Round-Trip Time

The latency or travel time measured by bandwidth detector 40 is not the round-trip travel time. The round-trip travel time includes both paths 38, 39. Instead, only the one-way latency is measured, from VoIP application 32 to VoIP application 30 over path 39. Separate bandwidth and congestion estimates allow for asymmetric latencies, such as when path 38 is restricted while path 39 is not. More precise bandwidth estimates are thus possible.

Figure 4:
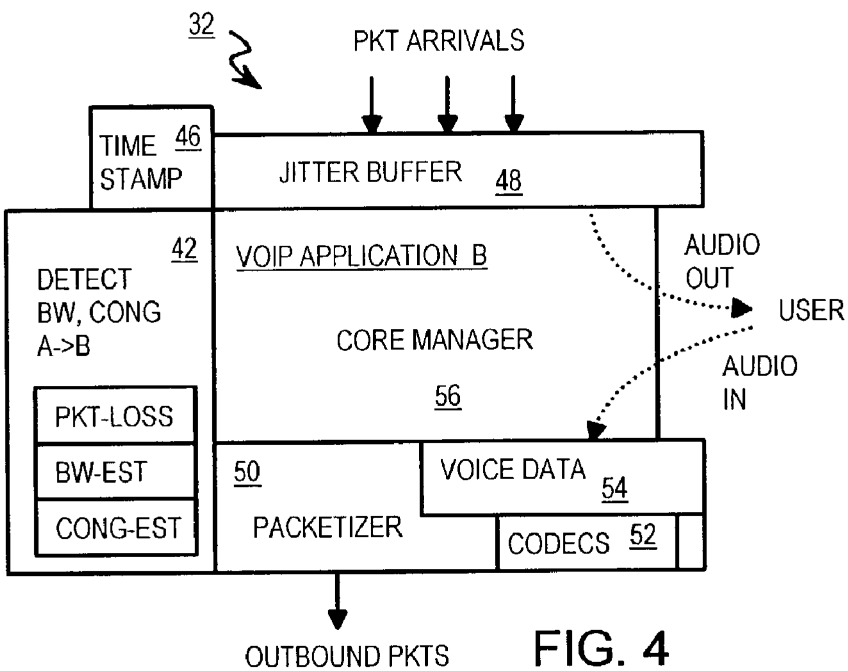
FIG. 4 shows in more detail a VoIP application with a bandwidth detector.

FIG. 4 shows in more detail a VoIP application with a bandwidth detector. VoIP application 32 captures user B's voice and stores the digitized voice as voice data 54. Codecs 52 are one or more voice encoders that compress and encode the raw digitized voice using a variety of algorithms. Standard as well as proprietary codecs can be used. Packetizer 50 forms the outgoing IP packets by adding headers and catalogs of the voice data, to the encoded voice data from codecs 52.

Incoming packets with user A's voice data are received and stored by jitter buffer 48. Some delay and variation in packet reception is accommodated by jitter buffer 48, and packets can be re-ordered by sequence number if received out of order. The packets are sent to core manager 56 of VoIP application 32, which extracts the voice data from the packets, examines the voice catalog, and selects the specified codec to decode and decompress the voice data. The final decoded, decompressed voice data is played as audio to user B. Core manager 56 may contain a variety of software modules including a user interface or may call other modules, library, or operating system routines.

Latency Measured by Time-Stamps

Time stamper 46 provides time-stamps or clock values that are an indication of time. Time stamper 46 generates the arrival time for each packet received by jitter buffer 48. Each packet also contains a send time that was included by the other VoIP application. Bandwidth detector 42 compares the arrival time with the send time for each packet to get the packet's travel time or latency. The change in latency over time is used to determine when congestion occurs.

The arrival rate of incoming packets is used to estimate bandwidth. For example, when the arrival times between packets increase, bandwidth is reduced. Bandwidth detector 42 generates current estimates for the incoming bandwidth, BW-EST, and congestion, CONG-EST.

Packetizer 50 receives the bandwidth and congestion estimates from bandwidth detector 42 and adds these to outgoing packets. The estimates may be numerical values such as S-bit or 8-bit binary numbers that represent a magnitude of bandwidth or congestion, or may be more qualitative values such as 2 or 3-bit values that indicate "good", "average", "poor", or "blocked" paths. One-bit values such as a congestion flag may also be used.

When packets fail to arrive at jitter buffer 48, or are substantially late, such as more than 2 seconds, the packet loss counter is incremented. The packet loss counter PKT-LOSS may also be included in outgoing packets.

Figure 5:
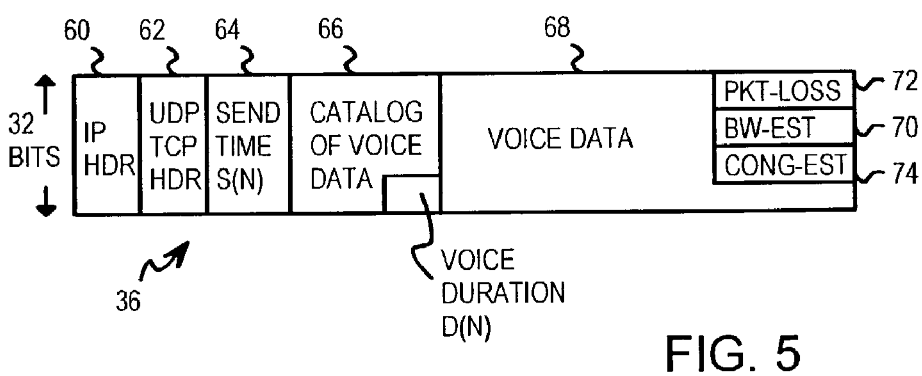
FIG. 5 shows an outgoing VoIP packet with bandwidth and congestion estimates for the incoming path.

FIG. 5 shows an outgoing VoIP packet with bandwidth and congestion estimates for the incoming path. IP packet 36 includes network-level header information such as a Telnet-Connect-Protocol (TCP) or user datagram protocol (UDP) header. Ethernet and Internet Protocol (IP) information may also be included. IP packet 36 may be further encapsulated during routing, such as by adding Virtual Private Networking (VPN) or other transport layering. Headers for lower-layer protocols can encapsulate headers for higher-level protocols.

IP header 60 contains the destination and source IP addresses while TCP/UDP header 62 contains the TCP or UDP port or other TCP information. Checksums and other information may also be included. Application audio or voice data field 68 contains the compressed and encoded voice data and may be sub-divided into several sub-fields.

Send time field 64 contains the send time S(N) or time-stamp value placed into packet 36 when the packet was transmitted. Catalog 66 is a directory of the voice-data contents of voice-data field 68. The playing time for the voice data, such as 20 milli-seconds, is the duration D(N). This voice duration can be explicitly or implicitly contained in catalog 66. The duration may have to be calculated by adding durations of segments of voice data in voice-data field 68, or by considering the kind of codec and compression used and the number of bytes of voice data.

The bandwidth estimate from the bandwidth detector can be added to packet 36. For example, the bandwidth estimate BW-EST, congestion estimate CONG-EST, and packet-loss counter PKT-LOSS can be added to the end of packet 36. Often unused bits are available at the end of the compressed voice data in voice-data field 68, or additional bits can be added to packet 36 for estimate fields 70, 72, 74, which contain the bandwidth, packet-loss, and congestion values.

Figure 6:
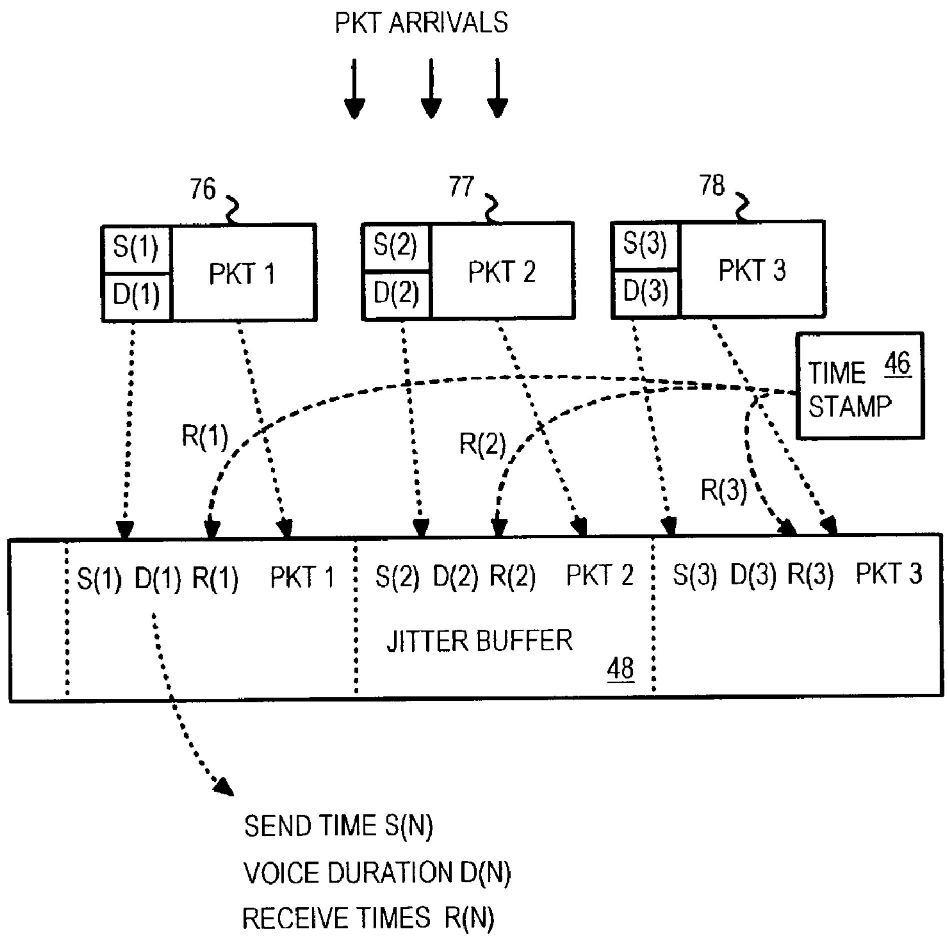
FIG. 6 highlights time-stamping of arriving packets.

FIG. 6 highlights time-stamping of arriving packets. VoIP packets 76, 77, 78 arrive from the Internet and are stored in jitter buffer 48. Each packet N contains a send time S(N) and a voice duration D(N). The voice duration may be explicit or implicit. For example, the total voice duration may have to be calculated as the sum of the durations of data sub-fields or audio frames in a packet, or may have to be adjusted for different codings and codecs used.

As packets 76, 77, 78 arrive, time stamper 46 outputs a value for the current time, which is associated with each arriving packet. For example, packet 76 arrives or is received by jitter buffer 48 at time R(1), while packet 3 is received at time R(3). These reception-time values can be stored with the packets in jitter buffer 48, or may be stored in a separate memory or buffer area but be associated or linked to the packet. The send time and duration from each packet could also be extracted and stored with the reception time in a different memory, such as one accessed by the bandwidth detector.

Congestion Detected by Latency Changes

The one-way latency or travel time is the difference of the send and reception times. Packet N's latency is R(N)–S(N). For actual networks, the latencies vary. When latency increases, congestion may be occurring. When latencies drop, congestion may be easing. The packet's latency is compared to a moving average of the latencies of many packets to determine when latency is increasing or decreasing, and thus signal when congestion is increasing or decreasing.

Bandwidth measured by Arrival Rate and Voice Duration

While latency changes are used to signal congestion, packet arrival rates are used to determine bandwidth. A packet's voice duration should equal the time between packet arrivals. Under ideal network conditions, the time between successive packets is equal to the voice duration. For example, when packets contain 10 milli-seconds of voice, the packets need to be sent every 10 milli-seconds (ms) for a continuous voice transmission. If packets contains 50 ms of voice, then it is expected to arrive 50 ms after the previous packet.

The time between arrivals of packets with successive sequence numbers is the inter-packet arrival time. This inter-packet arrival time is compared to the voice duration of the most recent packet to arrive. When the inter-packet arrival time is greater than the packet's voice duration, the network is too slow. When a network recovers or speeds up, inter-packet arrival times can be less than the packets' voice durations.

Figure 7A:
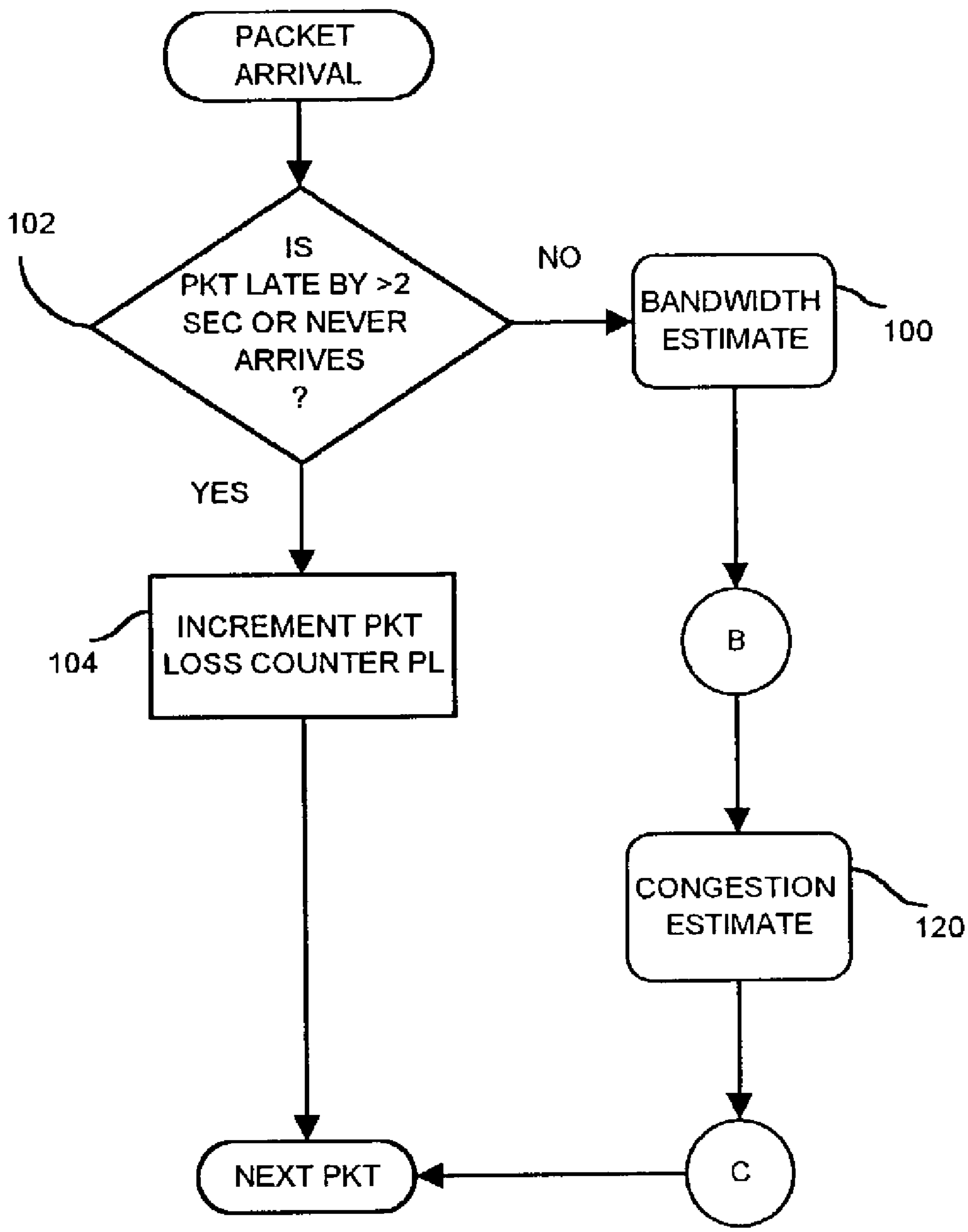
FIGS. 7A–C are flowcharts highlighting estimating bandwidth and congestion from packet arrival rates, latencies, and voice durations.
Figure 7B:
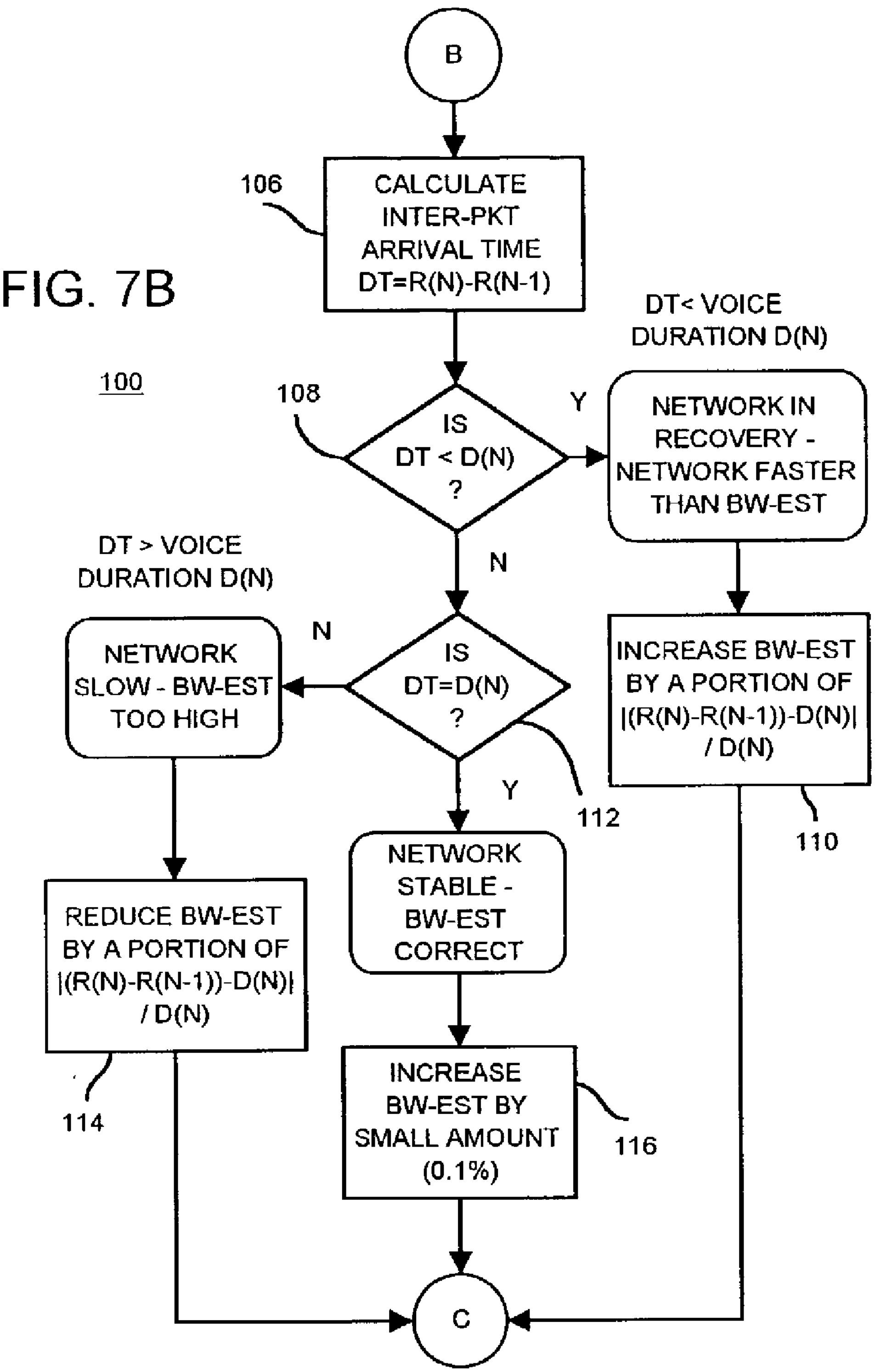
Figure 7C:
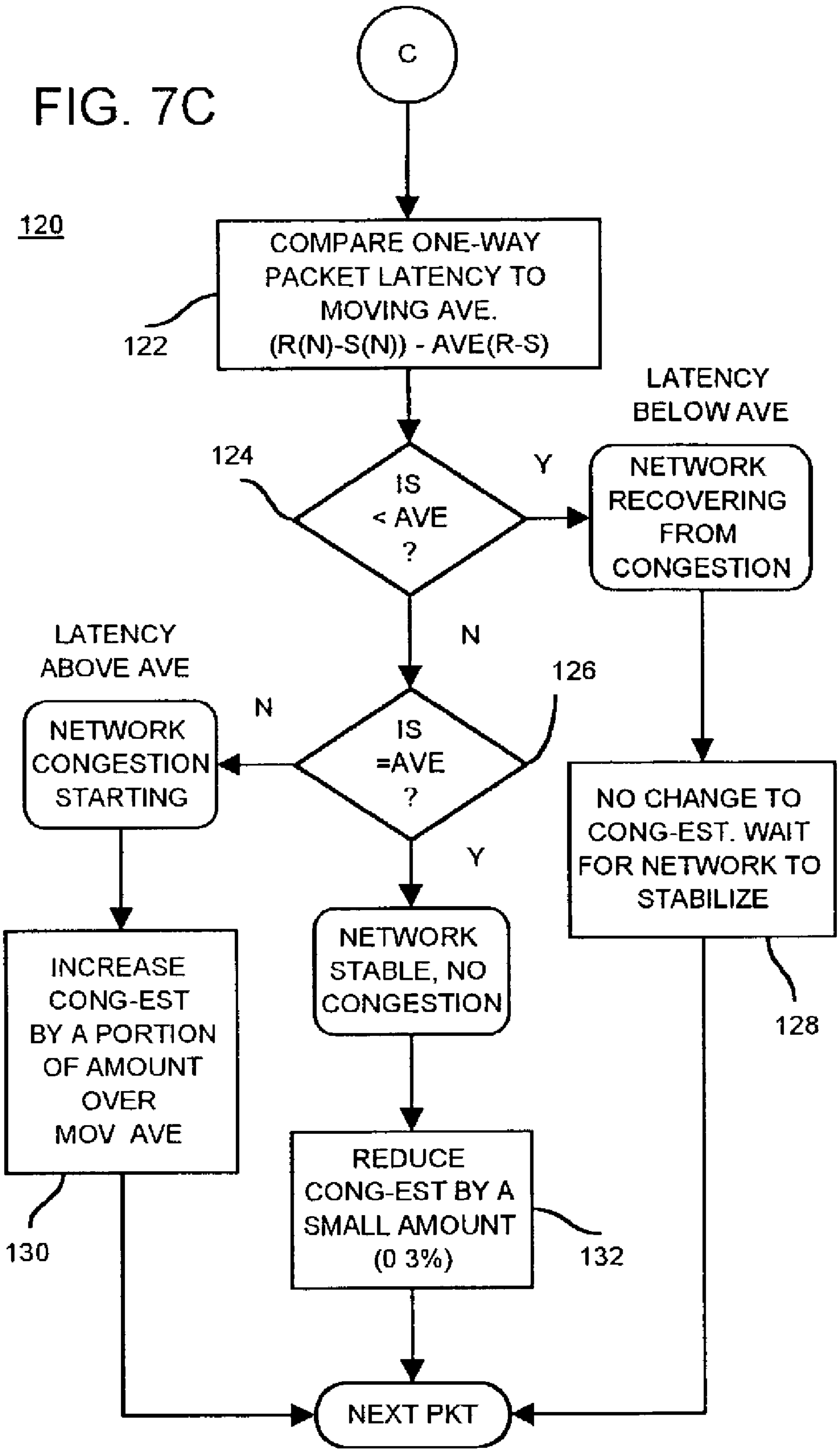

FIGS. 7A–C are flowcharts highlighting estimating bandwidth and congestion from packet arrival rates, latencies, and voice durations. In FIG. 7A, when a packet arrives at the jitter buffer, the jitter buffer or associated logic reads the packet's sequence number and determines if the packet is excessively late, such as more than 2 seconds late, step 102. When the packet does not arrive within the time limit, the packet loss counter PKT-LOSS is incremented, step 104. Packets that never arrive, such as packets that are dropped by the network, also increment the loss counter.

When a packet arrives within the time limit, step 102, bandwidth estimation 100 is performed as shown in FIG. 7B. Congestion estimation 120 as shown in FIG. 7C is also performed. These estimations can be performed on each arriving packet as the packet arrives or soon after, or can wait until several packets have arrived and can be processed together, or can be processed periodically at a set time interval or in the background when processing time is available.

Each packet's reception time R(N) is generated by the time stamper, and the packet's send time S(N) is extracted from the packet. Each packet's voice duration D(N) is also determined. In FIG. 7B, bandwidth estimation 100 determines the inter-packet arrival time DT, which for packet N is R(N)–R(N–1). Packet N–1 can be the packet with the previous sequence number before packet N. Once the inter-packet arrival time DT is calculated, step 106, it is compared to packet N's voice duration, D(N).

When the inter-packet arrival time DT is less than the voice duration D(N), the packet arrived early, step 108. This indicates that the network is operating more efficiently than currently estimated, and may be recovering from an earlier network problem or constriction. Since the current bandwidth estimate underestimates the potential bandwidth, the bandwidth estimate BW-EST is increased, step 110. While the bandwidth estimate could be increased by a fixed amount or some other amount, in this example BW-EST is increased in proportion to the absolute value of the fraction (R (N)−R(N−1)−D(N))/D(N), which is also (DT−D(N))/D(N), or the excess of the inter-packet arrival time DT over the voice duration, divided by the voice duration. The BW-EST may be increased by the whole fraction, or by a portion such as 10% or 50%. The portion may be programmably changed or dynamically changed in some embodiments.

When the inter-packet arrival time DT is greater than the voice duration D(N), the packet arrived late, steps 108, 112. This indicates that the network is operating less efficiently than currently estimated, and may be suffering from a network problem or bandwidth constriction. This can occur on limited-bandwidth links such as a modem line when the user sends or receives email or browses a web site while also using the VoIP application.

Since the current bandwidth estimate over-estimates the true bandwidth, the bandwidth estimate BW-EST is reduced, step 114. While the bandwidth estimate could be decreased by a fixed amount or some other amount, in this example BW-EST is decreased in proportion to the absolute value of the fraction (R(N)−R(N−1)−D(N))/D (N), which is also (D(N)−D−T/D(N), or the excess of the voice duration over the inter-packet arrival time DT, divided by the voice duration.

When the inter-packet arrival time DT is equal to the voice duration D(N), the packet arrived on time, step 112. This indicates that the network is stable and operating as efficiently as the current estimate. The bandwidth estimate is increased by a small amount, step 116, such as 0.1%. Increasing the bandwidth estimate when the network is stable allows the VoIP application to test if additional bandwidth is available.

In FIG. 7C, congestion estimate 120 is performed. The packet's latency or travel time from the remote VoIP application to the local VoIP application is determined, such as the difference of send and receive times, R(N)−5(N). A moving average of the packet latency is kept, such as for the last 20 or 100 or 1000 packets. The current packet's latency can be added to the moving average and the oldest moving average dropped either before or after comparison.

The current packet's latency is compared to the latency moving average, step 122. When the current packet's latency is below the moving average, step 124, then the latencies are falling and the network is improving. Latencies often fall when the network is recovering from a delay caused by congestion at a routing point. Since the network is likely recovering from a problem, the congestion estimate CONG-EST is left unchanged, step 128. This allows more time for the network to stabilize.

When the current packet's latency is above the moving average, steps 124, 126, then the latencies are rising and the network is deteriorating. Latencies often rise quickly when the network is just starting to see delays caused by congestion at a routing point. The congestion estimate is increased by a portion of the amount that the current packet's latency is above the moving average, step 130. The congestion estimate can quickly detect network problems such as at the very start of congestion using this method.

When the current packet's latency is about equal to the moving average latency, step 126, the network is stable and congestion is not apparent. The congestion estimate can be reduced by a small amount, step 132, such as 0.3% or 0.1% or a larger value such as 1%. This allows the congestion estimates to drop back after congestion ends once the network stabilizes again. Since many packets can arrive in a short time, the congestion estimate can recover quickly even when a small change is made.

The next packet arrival can then be processed by setting packet N+1 to be packet N, and the process repeated from FIG. 7A.

FIGS. 8A–B show graphs of packet arrivals and bandwidth estimates. FIG. 8A has the voice time or packet sequence number as the y-axis and the actual arrival times of packets as the x-axis. In this example packets have the same voice durations and should all arrive with the same inter-packet arrival time and thus fall along ideal line 250.

During time period 200, packets arrive along ideal line 250. FIG. 8B shows that the bandwidth estimate is increased slightly during this time of network stability. However, at time period 202, packets are delayed and arrive with longer inter-packet arrival times. Arrival times T4 and T5 are delayed, causing packets to arrive below ideal line 250, with a lower slope or arrival rate.

The bandwidth estimate is reduced by a portion of the lateness, and falls sharply during time period 202. When packets are very late, the bandwidth estimate can be reduced even before the packet arrives. A timer can wake up periodically to examine the most-recently-arrived packet. The maximum-size packet's duration can be compared against the time that has transpired since the last packet arrival. In an example where the network comes to almost a complete halt for an extended period, late packets can be detected by expiration of a maximum inter-arrival time. This can be factored into the bandwidth and congestion estimates.

Packets begin arriving at the ideal rate during period 204. The packets have the same slope as ideal line 250, but are below line 250 due to the delays from period 202. The bandwidth estimate rises slightly during this period.

The network recovers quickly during period 206 as many packets arrive in a short time. This can occur as a router recovers from a delay and works off its packet backlog. The packets rapid arrival produces a slope higher than that for ideal line 250, and eventually the packets reach line 250. The bandwidth estimate rises quickly during period 206 as a portion of the difference of inter-packet arrival time and the voice duration of the voice data inside the packets.

Finally in period 208 the network is again stable and packets arrive along ideal line 250. The bandwidth estimate is edged up slightly to test the upper limit of bandwidth.

FIGS. 9A–B show graphs of packet latencies and congestion estimates. In FIG. 9A, latencies of arriving VoIP packets are plotted as a function of voice time. A similar graph can be made using time or sequence number for the x-axis. The dotted line is the moving average of the latencies and shows less movement than the current packet latencies since it is an average.

Latencies are rising slightly over long time periods, as shown by the upward bias to the moving average during periods 210, 214. The congestion estimate remains relatively flat during periods 210, 214.

During period 212, a network problem or constriction occurs, causing the current packet latencies to rise sharply above the moving average. This can occur when a user sends or receives email over a modem line that is being used by the VoIP packets. The congestion estimate quickly rises as the latencies rise.

Rather than fall back as quickly as the latencies as the peak ends, the congestion estimate remains high as the current latencies fall sharply as FIG. 9B shows. This flat top to the congestion estimate allows time for the network to recover, perhaps causing the remote VoIP application to pause or reduce packet transmission until the congestion clears up. This can minimize the problem by not sending even more packets that could compound the congestion problem.

Once the current latencies cross the moving average line at the end of period 212 and the beginning of period 214, the congestion estimate starts to fall as the estimate is reduced by a small amount for each of many packets. As many packets are received, the congestion estimate falls back to the base level in period 214.

Congestion Detected Before Packet Loss Occurs

Congestion can be detected before packet loss occurs by detecting a rise in latencies that often occurs before packets are dropped. Congestion is quickly detected by the use of the moving average. Congestion estimates rise quickly but fall more slowly, allowing time for congested packets to be cleared out. The congestion estimate is fed back to the sender, allowing the sending application to reduce the bandwidth of packets being sent until the congestion ends.

The congestion estimate can quickly respond to delayed packets. The bandwidth estimate shows more of an overall picture of the total available flow of packets. The congestion estimate can more quickly react to sudden changes while the bandwidth estimate can be a smoother measure of the overall carrying capacity of the network path that is less sensitive to individual packets.

The congestion estimate may be designed to detect short term or sudden increases in the ability of the network to deliver packets, while the bandwidth estimate tracks the slower overall carrying-capacity of the network. Sharp changes in inter-packet arrival time (or lack of packet arrivals) trigger the congestion estimate to rise. It is common for congestion to subside just as rapidly. Very gradual changes in the overall carrying-capacity of the network may be followed by the bandwidth estimate, which is less sensitive to momentary spikes of congestion.

ALTERNATE EMBODIMENTS

Several other embodiments are contemplated by the inventor. For example various combinations of software, hardware, or firmware implementations are possible and various routines can be called and executed sequentially or in parallel. While the VoIP packets have been described as being routed over the public Internet, packets may be routed over other networks or combinations of networks such as Ethernets, Intranets, wireless networks, satellite links, etc. The audio packets can also include multi-media data such as images or text.

Rather than estimate bandwidth by calculating the latency for each packet, only a subset of the packets could be checked, such as every 5th packet or every 50th packet. The durations of intervening packets could be summed. The bandwidth and congestion estimates could likewise be embedded in only some of the outgoing packets rather than all outgoing packets. The bandwidth and congestion estimates could also be sent in separate packets without voice data. The voice data is really audio data that is often voice, but could include other audio data such as songs, music, traffic noise, etc.

The bandwidth estimate could also be kept constant when the network is stable, or could be increased by a different amount or by a variable amount. The congestion estimate could be performed before or after the bandwidth estimate, or at the same time. Parallel processing could be used on some systems.

Network recovery typically is very quick, and the congestion estimate can be raised immediately, or as shown in the previous embodiment, the congestion estimate can be left at its present level until such time as the network has cleared any backlog of stale or delayed packets.

The bandwidth and congestion estimate routines could be activated by the jitter buffer when packets are late in arriving but before the packets arrive. Since the sending times of the missing packets are not known, they may be interpolated from other packets, or a fixed number used to calculate the new arrival time, latency, or voice duration. The amount of voice data in packets can vary from packet to packet rather than be the same for all packets as described in the simplified examples. The jitter buffer may perform other functions, such as detecting and processing duplicate and missing packets. The jitter buffer can also vary the amount of buffering and consumption rate of voice data in concert with occurrences of congestion to minimize the acoustic impact and to provide time for the sending side to adjust its bandwidth consumption rate in response to the network condition.

The send and receive times may be relative times or somewhat different times, such as a time-stamp added just before transmission or some delay after the packet arrives, or could be added at other times. The time-stamp may be a full time in a 24-hour format, or may be a subset of the full time, such as the current minute and seconds values, or may be a relative time value such as from a counter that changes with time. A processor or other hardware timer may used, or perhaps accessed using software routines. The sending and receiving VoIP application timer can be synchronized by a third-party timer, or by using round-trip packet transit times to adjust or correct timer differences.

Synchronization between the remote and local VoIP applications can occur at the start of communication. A series of packets can be exchanged simultaneously in both directions between the local and remote applications. Each synchronizing packet can contain a sent time-stamp to which is then appended a received time-stamp. The packet may be returned to the opposite side where a third time-stamp of the return arrival can be made. From these packets, the round trip delay is easily determined, and by comparing the sent, received, and returned time-stamps on packets which went in opposite directions an estimate of the latency in each direction can be made. Using this information, the clocks at both ends can either be synchronized, or a known offset can be recorded so that remote-application's time-stamps can be adjusted into local time of the local VoIP application. In an alternate embodiment, absolute time-stamps can be abandoned and the methods can be implemented purely on relative time-stamps. For example, a send time of 12653 milli-sec from the start of a call and can be compared to a previous send time-stamp of 12571 milli-sec to get an elapsed time measurement.

Outlying data points such as from very slow packets could be removed to allow for an occasional transient or random dropped or delayed packet. Additional filtering could be performed. Many kinds of moving averages can be used, such as a simple arithmetic moving average, weighted moving averages that increase weighting of more recent data points, exponential moving averages, etc.

Data values can be considered "equal" if within a certain range of each other, such as within 1% or 5% or 0.1%. Also, rounding of values can be performed before comparison, effectively providing a range of "equal" values. Congestion and bandwidth estimates can use only a few bits to indicate qualitative measurements such as "normal", "minor restriction", "major restriction", "blocked", or may use more bits to represent a quantitative estimate such as a percentage or data rate. One or both users could be notified of problems by a tone or a display message, or the estimates could be logged to a file for debugging. The application may visually display a network-quality meter to the user. The estimates fed back to the sending VoIP application could allow the sender to stop or reduce packet transmission when problems occur, or could adjust compression or coding to reduce bandwidth to match the estimate.

VoIP calls may be between two users on personal computers, or may consist of one user on a personal computer talking to a computer server or gateway which converts the call from VoIP to telephone or PBX or private IP phone system formats. The call could also be between two telephone or private IP-phone users with a VoIP segment somewhere in the middle carrying the call from one location to another over the Internet or similar unmanaged network but terminating the call at each end on a telephone or PBX or IP phone. Calls could also involve a conversation between one user on a PC or telephone or IP phone, and at the other end an automated voice response system such as a banking application, voicemail, auto attendant, talking yellow pages or other automated voice service. More that two parties may exist in multi-way calling. The VoIP application could carry one user's audio signal to and from a central conference server hosting a number of other callers.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. § 1.72(b). Any advantages and benefits described may not apply to all embodiments of the invention. When the word "means" is recited in a claim element, Applicant intends for the claim element to fall under 35 USC § 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC §112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A voice-over-Internet-Protocol (VoIP) application comprising: a jitter buffer for receiving incoming VOID packets from an Internet, the incoming VOID packets containing compressed audio data from a remote VoIP application; an audio application, receiving the compressed audio data from the incoming VOID packets, for de-compressing the compressed audio data for playback to a user, and for capturing local audio data from the user; a packetizer, receiving the local audio data from the audio application, for compressing the local audio data and encapsulating the local audio data as well as data used to provide or derive an audio duration of the encapsulated data, into outgoing VoIP packets for transmission over the Internet to the remote VOID application; an estimator, receiving a reception time for a current VOID packet that indicates when the current VOID packet was received by the jitter buffer and the jitter buffer, for generating a bandwidth estimate for an incoming path through the Internet taken by the incoming VoIP packets; and a comparator, in the estimator, for comparing an arrival difference of the reception time and the prior reception time to the audio duration that indicates a duration of playback to the user of the compressed audio data encapsulated by the current VoIP packet; wherein the estimator decreases the bandwidth estimate when the comparator determines that the arrival difference exceeds the audio duration but increases the bandwidth estimate when the comparator determines that the arrival difference is below the audio duration; wherein the packetizer receives the bandwidth estimate from the estimator, the packetizer sending the bandwidth estimate to the remote VoIP application, whereby incoming bandwidth is estimated by comparison of the arrival difference to the audio duration.

2. The VoIP application of claim 1 wherein the estimator re-estimates the bandwidth estimate continuously for each incoming VoIP packet or periodically for a subset of the incoming VoIP packets.

3. The VoIP application of claim 1 wherein the packetizer inserts the bandwidth estimate into the outgoing VoIP packets.

4. The VoIP application of claim 1 wherein the jitter buffer re-orders the incoming VoIP packets based on sequence numbers contained in the incoming VoIP packets, whereby out-of-order incoming VoIP packets are re-ordered prior to audio playback.

5. A computerized method for estimating conditions on a network path from a remote application to a local application comprising:

receiving incoming audio packets that include audio data and audio duration data from the remote application;

extracting the duration-time from a current packet that indicates a duration of audio playing time of audio data contained in the current packet;

generating a receive-time for the current packet that indicates when the current packet was received by the local application;

calculating an inter-packet arrival time as a difference between receive-times for the current packet and a prior packet;

comparing the inter-packet arrival time to the duration-time of the current packet;

(1) when the inter-packet arrival time is greater than the duration-time, reducing a bandwidth estimate to indicate reduced available bandwidth of the network path;

(2) when the inter-packet arrival time is less than the duration-time, increasing the bandwidth estimate to indicate increased available bandwidth of the network path; and including the bandwidth estimate for the current packet in an outgoing packet to the remote application, whereby bandwidth estimates are made by the local application on audio packets received from the remote application and the bandwidth estimates are sent to the remote application.

6. The computerized method of claim 5 wherein the bandwidth estimate is included in an audio packet sent from the local application to the remote application, whereby the audio packet contains audio data from the local application but the bandwidth estimate for audio packets sent by the remote application.

7. The computerized method of claim 6 further comprising:

(3) when the inter-packet arrival time is substantially equal to the duration-time, increasing the bandwidth estimate by a small fixed amount to test for an increased available bandwidth of the network path.

8. The computerized method of claim 7 wherein reducing the bandwidth estimate comprises reducing the bandwidth estimate by a portion of a difference of the inter-packet arrival time and the duration-time;

wherein increasing the bandwidth estimate comprises increasing the bandwidth estimate by a portion of a difference of the duration-time and the inter-packet arrival time, whereby bandwidth estimate changes are in proportion to differences between the duration-time and the inter-packet arrival time.

9. The computerized method of claim 8 wherein the portion is a multiple of the duration-time.

10. The computerized method of claim 8 wherein the prior packet has a sequence number that is less than a sequence number for the current packet.

11. The computerized method of claim 10 wherein the sequence number of the prior packet is one less than the sequence number of the current packet.

12. A computer-program product comprising:

a computer-usable medium having computer-readable program code means embodied therein for estimating incoming bandwidth, the computer-readable program code means in the computer-program product comprising:

buffer means for receiving incoming packets sent by a remote audio application over a first network path;

wherein an incoming packet contains encoded remote audio data for replay to a local user and a duration value that indicate a duration of audio playback of the encoded remote audio data in the incoming packet;

audio means, receiving the encoded remote audio data, for decoding the encoded remote audio data for replay to the local user, and for encoding local audio captured from the local user to generated encoded local audio;

arrival timer means, coupled to the buffer means, for determining a delay between arrivals of the incoming packets;

analysis means for comparing the duration value to the delay from the arrival timer means and for adjusting a bandwidth estimate based on a comparison result; and packeting means for generating outbound packets adding a packet header to segments of the encoded local audio, the packet header for assisting routing of the outbound packets to the remote audio application over a second network path that can differ from the first network path;

wherein the packeting means sends the bandwidth estimate from the analysis means to the remote audio application, to indicate a condition of the first network path, whereby current-status feedback of the first network path is sent to the remote audio application.

13. The computer-program product of claim 12 wherein the packeting means inserts the bandwidth estimate from the analysis means into at least some of the outbound packets to provide current-status feedback to the remote audio application, the current-status feedback indicating a condition of the first network path, whereby current-status feedback of the first network path is sent to the remote audio application with the encoded local audio.

14. The computer-program product of claim 12 further comprising:

packet loss means for increasing a packet loss counter when an incoming packet sent by the remote audio application fails to arrive at the buffer means within an acceptable delay, wherein the packeting means sends the packet loss counter from the packet loss means to the remote audio application.

* * * * *

UNITED STATES PATENT AND TRADEMARK OFFICE

CERTIFICATE OF CORRECTION

PATENT NO. : 6,996,626 B1
APPLICATION NO. : 10/065951
DATED : February 7, 2006
INVENTOR(S) : Shawn W. Smith It is certified that error appears in the above-identified patent and that said Letters Patent is hereby corrected as shown below:

In Claim 1, Column 11, lines 60, 61, and Column 12, lines 4 and 6, all occurrences of the acronym “VOID” should read --VoIP--

Signed and Sealed this

Twenty-second Day of August, 2006

JON W. DUDAS
*Director of the United States Patent and Trademark Office*